US009298371B1

(12) United States Patent
Selvam et al.

(10) Patent No.: US 9,298,371 B1
(45) Date of Patent: Mar. 29, 2016

(54) SYSTEM AND METHOD OF REDUCING WRITE CYCLES AND INCREASING LONGEVITY OF NON-VOLATILE MEMORY IN BASEBOARD MANAGEMENT CONTROLLER (BMC)

(71) Applicant: AMERICAN MEGATRENDS, INC., Norcross, GA (US)

(72) Inventors: Jothiram Selvam, Paderborn (DE); Venkatesan Balakrishnan, Chennai (IN)

(73) Assignee: AMERICAN MEGATRENDS, INC., Norcross, GA (US)

( * ) Notice: Subject to any disclaimer, the term of this patent is extended or adjusted under 35 U.S.C. 154(b) by 0 days.

(21) Appl. No.: 14/579,150

(22) Filed: Dec. 22, 2014

(51) Int. Cl.
G06F 12/00 (2006.01)
G06F 3/06 (2006.01)
G06F 9/44 (2006.01)

(52) U.S. Cl.
CPC ............ *G06F 3/0607* (2013.01); *G06F 3/0632* (2013.01); *G06F 3/0643* (2013.01); *G06F 3/0647* (2013.01); *G06F 3/0679* (2013.01); *G06F 9/4401* (2013.01); *G06F 2206/1014* (2013.01)

(58) Field of Classification Search
CPC ... G06F 3/0607; G06F 3/0643; G06F 3/0647; G06F 3/0632; G06F 3/067; G06F 9/44; G06F 2206/1014
See application file for complete search history.

(56) References Cited

U.S. PATENT DOCUMENTS

| 8,495,618 | B1 * | 7/2013 | Inbaraj | G06F 8/665 717/172 |
| 2003/0051114 | A1 * | 3/2003 | Natu | G06F 12/0623 711/165 |
| 2006/0236198 | A1 * | 10/2006 | Lintz, Jr. | G06F 11/0727 714/758 |
| 2009/0222650 | A1 * | 9/2009 | Chen | G06F 8/65 713/1 |

* cited by examiner

*Primary Examiner* — Kevin Verbrugge
*Assistant Examiner* — Alan Otto
(74) *Attorney, Agent, or Firm* — Tim Tingkang Xia, Esq.; Locke Lord LLP

(57) ABSTRACT

Certain aspects direct to a baseboard management controller (BMC), which is capable of reducing write cycles and increasing longevity of its non-volatile memory. The non-volatile memory of the BMC has a file system mounted thereon. The file system defines a configuration directory storing configuration data in a binary format and migration data. In booting, the firmware of the BMC compares its version information to the version information of the configuration data. If the version information matches, the BMC uses the configuration data as is. If the version information does not match, the firmware retrieves and uses the migration data to convert the first configuration data to an initialization (INI) file in a text-based format, and then converts the generated INI file back to the binary format to update the configuration data in the configuration directory. Finally, the firmware updates the migration data in the configuration directory for future migration use.

25 Claims, 4 Drawing Sheets

SYSTEM AND METHOD OF REDUCING WRITE CYCLES AND INCREASING LONGEVITY OF NON-VOLATILE MEMORY IN BASEBOARD MANAGEMENT CONTROLLER (BMC)

FIELD

The present disclosure relates generally to baseboard management controller (BMC) technology, and more particularly to systems and methods of reducing write cycles and increasing longevity of non-volatile memory in a BMC.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A baseboard management controller (BMC) refers to a specialized microcontroller that manages the interface between system management software and platform hardware. The BMC may be embedded on the baseboard or motherboard of a computer, generally a server. For example, different types of sensors can be built into the computer system, and the BMC reads these sensors to obtain parameters such as temperature, cooling fan speeds, power status, operating system (OS) status, etc.

Typically, a BMC has a flash memory or other types of non-volatile memory to store its firmware and other necessary configuration data. The flash memory has a limited write cycle range. A write cycle, sometimes referred to as a program/erase (P/E) cycle, is a process of recording data on the flash memory. A flash memory may generally withstand a certain number of write cycles before the integrity of the flash memory starts to deteriorate. However, in the BMC operation, the configuration data may be changed or updated due to certain configuration events. In some cases, each configuration change may generate multiple write cycles, thus reducing the lifespan of the flash memory.

Therefore, an unaddressed need exists in the art to address the aforementioned deficiencies and inadequacies.

SUMMARY

Certain aspects of the disclosure direct to a system, which includes a baseboard management controller (BMC). In certain embodiments, the BMC includes a processor and a non-volatile memory having a file system mounted thereon. The file system defines a configuration directory configured to store first configuration data in a binary format and first migration data, where the first migration data indicates a conversion of the first configuration data from the binary format to a text-based format; and at least one firmware directory configured to store computer executable code, where the computer executable code comprises second migration data. The computer executable code, when executed at the processor, is configured to: perform a booting operation of the BMC; perform at least one management operation based on the first configuration data; and in response to a configuration change event, update the first configuration data in the configuration directory based on the configuration change event. In certain embodiments, the booting operation includes: (a) determining whether version information of the first configuration data stored in the configuration directory matches version information of the computer executable code; (b) in response to determining that the version information of the first configuration data does not match the version information of the computer executable code, (i) retrieving the first migration data from the configuration directory; (ii) generating second configuration data in the text-based format by converting the first configuration data to the second configuration data based on the retrieved first migration data; (iii) converting the generated second configuration data to third configuration data in the binary format, wherein the third configuration data comprises the version information of the computer executable code; and (iv) updating the first configuration data in the configuration directory with the third configuration data; and (c) updating the first migration data in the configuration directory with the second migration data.

In certain embodiments, the non-volatile memory is a flash memory, and the file system is a Journalling Flash File System version 2 (JFFS2).

In certain embodiments, the first configuration data includes at least one configuration file. In certain embodiments, the version information of the first configuration data is a version number of the computer executable code. In certain embodiments, the version number is stored in the first byte of the at least one configuration file.

In certain embodiments, the computer executable code stored in the at least one firmware directory is read-only in the booting operation and in the at least one management operation.

In certain embodiments, the computer executable code, when executed at the processor, is further configured to: in response to a firmware flash event, perform a flashing operation to update the computer executable code in the at least one firmware directory, wherein the at least one firmware directory is rewritable in the flashing operation.

In certain embodiments, the computer executable code includes: a management module configured to perform the booting operation of the BMC, and to perform the at least one management operation based on the first configuration data; a flasher module configured to perform the flashing operation in response to the firmware flash event; and a configuration update module configured to update the first configuration data in the configuration directory in response to the configuration change event.

In certain embodiments, the second configuration data in the text-based format comprises at least one initialization (INI) file recognizable by both the pre-updated computer executable code and the post-updated computer executable code.

In certain embodiments, when the version information of the first configuration data matches the version information of the computer executable code, the second migration data is identical to the first migration data.

Certain aspects of the disclosure direct to a method of reducing write cycles and increasing longevity of a non-volatile memory in a BMC. In certain embodiments, the non-volatile memory has a file system mounted thereon, and the file system defines: a configuration directory configured to store first configuration data in a binary format and first migration data, wherein the first migration data indicates a conversion of the first configuration data from the binary format to a text-based format; and at least one firmware directory configured to store computer executable code, wherein the computer executable code comprises second migration data. In certain embodiments, the method includes: performing, at a processor of the BMC, a booting operation of the BMC; performing, at the processor of the BMC, at least one management operation based on the first configuration data; and in response to a configuration change event, updating, by the processor of the BMC, the first configuration data in the configuration directory based on the configuration change event. In certain embodiments, the booting operation includes: (a) determining whether version information of the first configuration data stored in the configuration directory matches version information of the computer executable code; (b) in response to determining that the version information of the first configuration data does not match the version information of the computer executable code, (i) retrieving the first migration data from the configuration directory; (ii) generating second configuration data in the text-based format by converting the first configuration data to the second configuration data based on the retrieved first migration data; (iii) converting the generated second configuration data to third configuration data in the binary format, wherein the third configuration data comprises the version information of the computer executable code; and (iv) updating the first configuration data in the configuration directory with the third configuration data; and (c) updating the first migration data in the configuration directory with the second migration data.

In certain embodiments, the non-volatile memory is a flash memory, and the file system is JFFS2.

In certain embodiments, the first configuration data includes at least one configuration file. In certain embodiments, the version information of the first configuration data is a version number of the computer executable code. In certain embodiments, the version number is stored in the first byte of the at least one configuration file.

In certain embodiments, the method further includes: in response to a firmware flash event, performing, at the processor of the BMC, a flashing operation to update the computer executable code in the at least one firmware directory. In certain embodiments, the computer executable code stored in the at least one firmware directory is read-only in the booting operation and in the at least one management operation, and the at least one firmware directory is rewritable in the flashing operation.

In certain embodiments, the second configuration data in the text-based format comprises at least one INI file recognizable by both the pre-updated computer executable code and the post-updated computer executable code.

In certain embodiments, when the version information of the first configuration data matches the version information of the computer executable code, the second migration data is identical to the first migration data.

Certain aspects of the disclosure direct to a non-transitory computer readable medium storing computer executable code. In certain embodiments, the code, when executed at a processor of a BMC, is configured to: perform a booting operation of the BMC, wherein the BMC comprises the processor and the non-transitory computer readable medium having a file system mounted thereon, and wherein the file system defines: a configuration directory configured to store first configuration data in a binary format and first migration data, wherein the first migration data indicates a conversion of the first configuration data from the binary format to a text-based format; and at least one firmware directory configured to store the computer executable code, wherein the computer executable code comprises second migration data; perform at least one management operation based on the first configuration data; and in response to a configuration change event, update the first configuration data in the configuration directory based on the configuration change event. In certain embodiments, the booting operation includes: (a) determining whether version information of the first configuration data stored in the configuration directory matches version information of the computer executable code; (b) in response to determining that the version information of the first configuration data does not match the version information of the computer executable code, (i) retrieving the first migration data from the configuration directory; (ii) generating second configuration data in the text-based format by converting the first configuration data to the second configuration data based on the retrieved first migration data; (iii) converting the generated second configuration data to third configuration data in the binary format, wherein the third configuration data comprises the version information of the computer executable code; and (iv) updating the first configuration data in the configuration directory with the third configuration data; and (c) updating the first migration data in the configuration directory with the second migration data.

In certain embodiments, the non-volatile memory is a flash memory, and the file system is JFFS2.

In certain embodiments, the first configuration data includes at least one configuration file. In certain embodiments, the version information of the first configuration data is a version number of the computer executable code. In certain embodiments, the version number is stored in the first byte of the at least one configuration file.

In certain embodiments, the computer executable code, when executed at the processor, is further configured to: in response to a firmware flash event, perform a flashing operation to update the computer executable code in the at least one firmware directory. In certain embodiments, the computer executable code stored in the at least one firmware directory is read-only in the booting operation and in the at least one management operation, and the at least one firmware directory is rewritable in the flashing operation.

In certain embodiments, the computer executable code includes: a management module configured to perform the booting operation of the BMC, and to perform the at least one management operation based on the first configuration data; a flasher module configured to perform the flashing operation in response to the firmware flash event; and a configuration update module configured to update the first configuration data in the configuration directory in response to the configuration change event.

In certain embodiments, the second configuration data in the text-based format comprises at least one initialization (INI) file recognizable by both the pre-updated computer executable code and the post-updated computer executable code.

In certain embodiments, when the version information of the first configuration data matches the version information of the computer executable code, the second migration data is identical to the first migration data.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, wherein.

DETAILED DESCRIPTION

Figure 1:
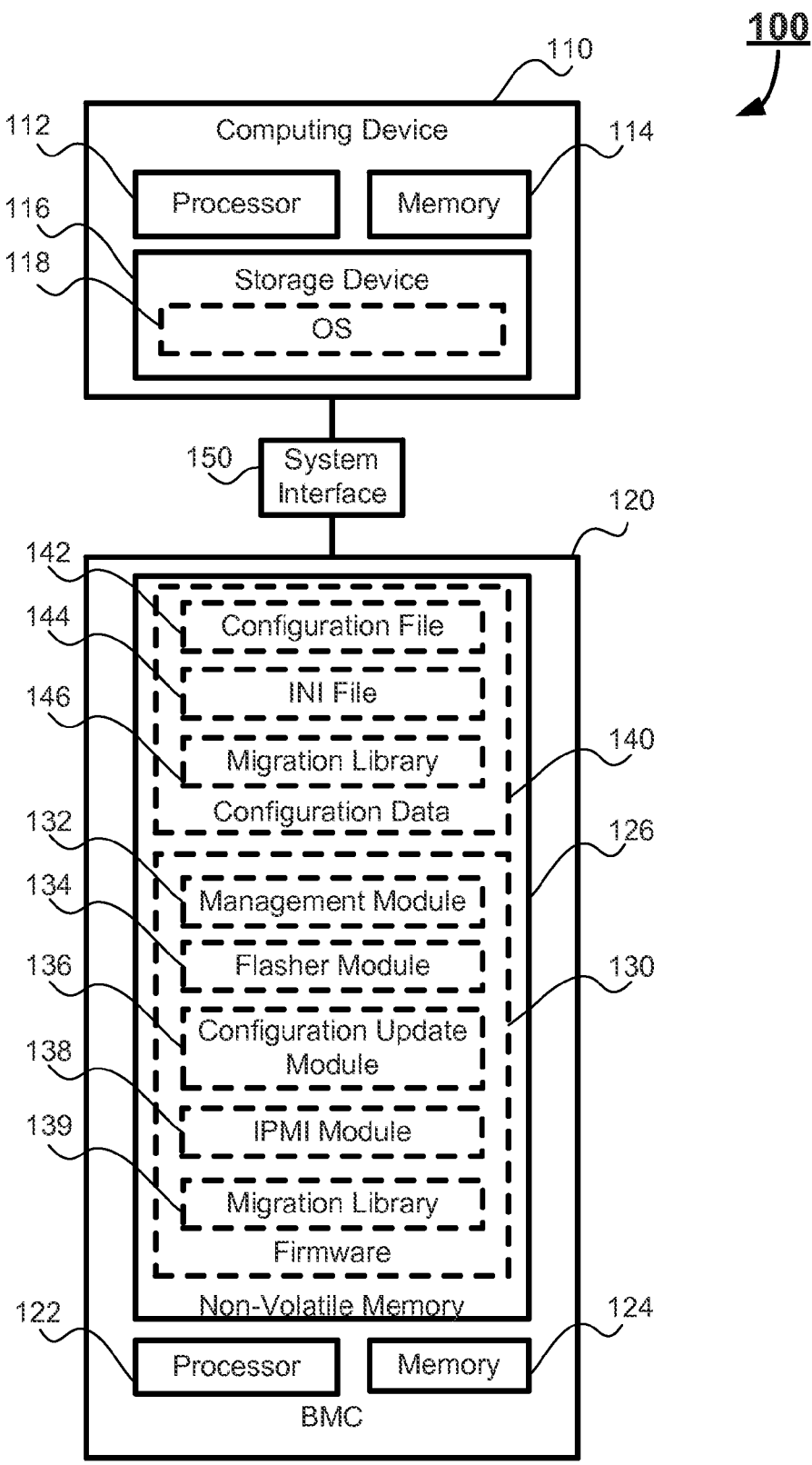
FIG. 1 schematically depicts a system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

As used herein, the term "headless system" or "headless machine" generally refers to the computer system or machine that has been configured to operate without a monitor (the missing "head"), keyboard, and mouse.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refer to a hardware electronic component, and may refer to or include a small electronic circuit unit, also known as an integrated circuit (IC), or a combination of electronic circuits or ICs.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

As discussed above, a BMC has a flash memory or other types of non-volatile memory to store its firmware and other necessary configuration data. In certain embodiments, the configuration data may include two sets of configuration data, including first configuration data in a binary format and second configuration data in a text-based format. The first configuration data in the binary format is used by the firmware to have faster access to the configuration data. An example of the first configuration data may be one or more configuration files with the extension name of .dat, in which the configuration data is stored in the binary format. On the other hand, the second configuration data in the text-based format is used for data migration purposes. An example of the second configuration data may be one or more initialization (INI) files with the extension name of .ini, in which the configuration data is stored in the text-based format.

The reason to maintain the two sets of configuration data is to ensure that the configuration data may be successfully migrated in firmware flashing. For example, when a new firmware for the BMC is available, the new firmware may be updated or "flashed" into the non-volatile memory of the BMC to replace the current firmware of the BMC, and then the BMC reboots to execute the new firmware. Generally, the new firmware may be of a different version from the current firmware. For example, the vendor of the BMC may provide a firmware of a new version for the BMC. In the operation of the BMC under the firmware of the new version, an unexpected error may occur such that the BMC may not function correctly with the flashed firmware. In this case, the administrator of the system may have to flash the firmware of the older version back to restore the BMC. Thus, in the restoring flash process, the pre-updated firmware is of a newer version, and the post-updated firmware is of an older version. However, the firmware of the newer version (i.e., the pre-updated firmware) may have updated some of the first configuration data in the binary format (e.g., the .dat files), such that the firmware of the older version (i.e., the post-updated firmware) may not recognize the first configuration data in the binary format (e.g., the .dat files) correctly. In other words, migration of the configuration data may not be performed correctly if the configuration data is only stored in the binary format.

One solution to deal with the migration of the configuration data is to have the firmware synchronously updating the first configuration data in the binary format and the second configuration data in the text-based format. For example, if the pre-updated firmware has updated both the first configuration data in the binary format (e.g., the .dat files) and the second configuration data in the text-based format (e.g., the INI files) synchronously, the post-updated firmware may be capable of recognize the second configuration data in the text-based format correctly. Thus, after the restoring flash process, the post-updated firmware may retrieve the configuration data from the second configuration data in the text-based format (e.g., the INI files), and convert the configuration data back to the binary format to generate the first configuration data in the binary format. In this case, both forward and backward migration of the configuration data may be possible by using the INI files.

However, to allow the synchronization of the first configuration data in the binary format and the second configuration data in the text-based format, the firmware must update both the first configuration data in the binary format (e.g., the .dat files) and the second configuration data in the text-based format (e.g., the INI files) whenever there is a configuration change. In other words, whenever a configuration change event occurs, the firmware must perform two write cycles to ensure that the updated configuration data is saved into both the first configuration data in the binary format (e.g., the .dat files) and the second configuration data in the text-based format (e.g., the INI files). This process increases the write cycles of the flash memory of the BMC.

One aspect of the present disclosure is directed to a system of reducing write cycles and increasing longevity of a non-volatile memory in a BMC. Instead of using the second configuration data in the text-based format (e.g., the INI files) to perform migration, the firmware of the BMC is provided with a migration library, which is used for converting the first configuration data in the binary format (e.g., the .dat files) to the second configuration data in the text-based format (e.g., the INI files) for migration. Since the second configuration data in the text-based format (e.g., the INI files) is converted only when migration is required, the system will save a lot of additional write cycles for the INI files, thus increasing the longevity of the non-volatile memory of the BMC.

FIG. 1 schematically depicts a system according to certain embodiments of the present disclosure. The system 100 is capable of performing HA configuration and validation under the VDI. As shown in FIG. 1, the system 100 includes a computing device 110 and a BMC 120. The BMC 120 is connected to the computing device 110 via a system interface 150. In certain embodiments, a remote management computer can be connected to the BMC 120 via a network (not shown). The system 100 may be a system that incorporates more than one interconnected system, such as a client-server network. The network may be a wired or wireless network, and may be of various forms such as a local area network (LAN) or wide area network (WAN) including the Internet. In certain embodiments, the system 100 may include other physical or virtual components not shown in FIG. 1.

The system interface 150 is an interface to perform data transfer between the computing device 110 and the BMC 120. In certain embodiments, the system interface 150 may be a typical standardized Intelligent Platform Management Interface (IPMI) system interfaces, such as a keyboard controller style (KCS) interface, a system management interface chip (SMIC) interface, or a block transfer (BT) interface. In certain embodiments, the BMC 120 may be connected to the computing device 110 via one or more interfaces replacing or in addition to the system interface 150. For example, the BMC 120 may be connected to the computing device 110 via a universal serial bus (USB) interface. In certain embodiments, data transfer between the computing device 110 and the BMC 120 may be in the format of IPMI messages, which goes through the system interface 150 or any other interfaces between the computing device 110 and the BMC 120.

The computing device 110 is a host computer of the BMC 120. In certain embodiments, the computing device 110 may be a general purpose computer or a headless computer. Generally, the computing device 110 includes a baseboard or the "motherboard" (not shown). The baseboard is a printed circuit board to which a multitude of components or devices may be connected by way of a system bus or other electrical communication paths. Although not explicitly shown in FIG. 1, the components on the baseboard are interconnected, and the layout of the components on the baseboard and the manner of the interconnection between the components on the baseboard is herein referred to as the configuration of the baseboard. One of ordinary skill in the art would appreciate that the configuration of the baseboard may be adjusted or changed according to the necessary design or manufacturing requirements.

The components on the baseboard of the computing device 110 may include, but not limited to, a processor 112, a memory 114, and other required memory and Input/Output (I/O) modules (not shown). In certain embodiments, the BMC 120 may also be a component on the baseboard. In certain embodiments, the processor 112 and the memory 114 may be embedded on the baseboard, or may be connected to the baseboard through at least one interface. In certain embodiments, the interface may be physical hardware interface such as electrical connectors, buses, ports, cables, terminals, or other I/O devices.

Further, the computing device 110 includes a storage device 116, which stores a plurality of software applications, including an operating system (OS) 160. In certain embodiments, the storage device 116 may be connected to the baseboard of the computing device 110. In certain embodiments, the computing device 110 may include at least one I/O device (not shown) for generating and controlling input and output signals of the computing device 110. Examples of the I/O device include keyboards, touch pads, mouse, microphones, display screens, touch screens, or other I/O devices applicable for the computing device 110. Some I/O devices, such as touch screens, are provided for the dual input/output purposes.

The processor 112 is a host processor which is configured to control operation of the computing device 110. In certain embodiments, the processor 112 may be a central processing unit (CPU). The processor 112 may execute the OS 160 or other applications of the computing device 110. In certain embodiments, the computing device 110 may run on or more than one processor, such as two processors, four processors, eight processors, or any suitable number of processors.

The memory 114 may be a volatile memory, such as the random-access memory (RAM), for storing the data and information during the operation of the computing device 110. In certain embodiments, the memory 114 is in communication with the processor 112 through a system bus (not shown).

The storage device 118 is a non-volatile data storage media for storing the OS 160 and other applications of the computing device 110. Examples of the storage device 118 may include flash memory, memory cards, USB drives, hard drives, floppy disks, optical drives, or any other types of data storage devices.

The OS 160 may be collective management software managing the operation of the computing device 110. For example, the OS 160 can include a set of functional programs that control and manage operations of the devices connected to the computing device 110. The set of application programs provide certain utility software for the user to manage the computing device 110. In certain embodiments, the OS 160 is operable to multitask, i.e., execute computing tasks in multiple threads, and thus may be any of the following: MICROSOFT CORPORATION's "WINDOWS 95," "WINDOWS CE," "WINDOWS 98," "WINDOWS 2000" or "WINDOWS NT", "WINDOWS Vista,", "WINDOWS 7," and "WINDOWS 8," operating systems, IBM's OS/2 WARP, APPLE's MACINTOSH OSX operating system, LINUX, UNIX, etc. In certain embodiments, the OS 160 can also be compatible to the IPMI architecture for generating IPMI messages in order to communicate with the BMC 120.

The BMC 120 is a specialized microcontroller that manages the interface between system management software and platform hardware. In certain embodiments, the BMC 120 may be a service processor (SP). Different types of sensors can be built into the computing device 110, and the BMC 120 reads these sensors to obtain parameters such as temperature, cooling fan speeds, power status, OS status, etc.

The BMC 120 monitors the sensors and can send out-of-band (OOB) alerts to a system administrator of the computing device 110 if any of the parameters do not stay within preset limits, indicating a potential failure of the computing device 110. In certain embodiments, the administrator can also remotely communicate with the BMC 120 from a remote management computer via a network to take remote action to the computing device 110. For example, the administrator may reset the computing device 110 from the remote management computer through the BMC 120, and may obtain system information of the computing device 110 OOB without interrupting the operation of the computing device 110.

As shown in FIG. 1, the BMC 120 includes a processor 122, a memory 124 and a non-volatile memory 126. In certain embodiments, the BMC 120 may include other components, such as at least one I/O device (not shown).

The processor 122 controls operation of the BMC 120. The processor 122 may execute the firmware 130 or other codes stored in the BMC 120. In certain embodiments, the BMC 120 may run on or more than one processor.

The memory 124 may be a volatile memory, such as the RAM, for storing the data and information during the operation of the BMC 120. When the BMC 120 restarts, the contents stored in the memory 124 will be lost.

As shown in FIG. 1, the non-volatile memory 126 stores the firmware 130 and the configuration data 140 of the BMC 120. In certain embodiments, the non-volatile memory 126 may be a flash memory.

The firmware 130 of the BMC 120 includes computer executable codes for performing the operation of the BMC 120. As shown in FIG. 1, the firmware 130 includes, among other things, a management module 132, a flasher module 134, a configuration update module 136, an IPMI module 138, and a migration library 139.

The management module 132 controls the management functions of the BMC 120. In certain embodiments, the management module 132 is configured to perform a plurality of operations of the BMC 120. These operations may include, without being limited to, a booting operation of the BMC 120, and at least one management operation. In certain embodiments, the management module 132 performs the management operation based on the configuration file 142 of the configuration data 140, which is in the binary format. Details of the booting operation will be described later.

The flasher module 134 controls the flashing operation of the BMC 120. When a firmware flash event occurs, the flasher module 134 will perform a flashing operation in response to the firmware flash event to update the computer executable code of the firmware 130. In certain embodiments, the firmware flash event may include a user induced event, in which the user inputs an instruction to the BMC 120 to perform the flashing operation. Generally, the pre-updated firmware and the post-updated firmware may be different versions, and the firmware 130 may have a version number to indicate the version information of the firmware 130.

The configuration update module 136 controls the update of the configuration data 140. Specifically, when the BMC 120 is performing the booting operation or the management operation, a configuration change event may occur. Examples of the configuration change event may include, without being limited to, a management event generated by the management operation of the management module 132, a sensor event generated by a sensor signal received from the computing device 110, or a user induced event in which the user inputs an instruction to the BMC 120 to change the configuration data.

In response to the configuration change event, the configuration update module 136 may update the configuration data 140 based on the configuration change event.

The IPMI module 138 is configured to IPMI messages. In certain embodiments, when the firmware 130 generates data to be transferred to the computing device 110 under the IPMI architecture, the firmware 130 sends the data to the IPMI module 138. Upon receiving the data, the IPMI module 138 converts the data to corresponding IPMI messages, and sends the IPMI messages to the computing device 110. When the firmware 130 receives IPMI messages from the computing device 110 or any other IPMI compatible devices, the IPMI module 138 processes the IPMI messages to generate data recognizable by the firmware 130, and then sends the data back to the firmware 130 for further process.

The migration library 139 includes migration data for data migration purposes. In particular, the migration library 139 is used for updating the migration library 146 of the configuration data 140, and is not used for the actual data migration. Specifically, in the booting operation, when the data migration is performed, at the end of the data migration process, the management module 132 may update the migration library 146 of the configuration data 140 with the migration data in the migration library 139 of the firmware 130, such that the migration data of the migration library 146 is synchronous to the migration data of the migration library 139 of the firmware 130.

In certain embodiments, the firmware 130 may include a web connection module (not shown) for communication with the network such that the administrator of the computer system may connect to the BMC 120 remotely from a remote management computer via the network.

The configuration data 140 includes a plurality of files related to configuration of the BMC 120. In certain embodiments, the configuration data 140 may include first configuration data in the binary format, second configuration in the text-based format, and migration data for converting the first configuration data in the binary format to the second configuration in the text-based format. As shown in FIG. 1, the configuration data 140 includes a configuration file 142 in the binary format as the first configuration data, an INI file 144 in the text-based format as the second configuration data, and a migration library 146 as the migration data.

The configuration file 142 represents the first configuration data of the BMC 120 in the binary format. Since the configuration file 142 is in the binary format, the management module 132 of the firmware 130 may have fast access to the configuration file 142 such that the management module 132 may perform the management operation based on the configuration file 142. When a configuration change event occurs, the configuration update module 136 may update the configuration file 142 based on the configuration change event. An example of the configuration file 142 may be a file with the extension name of .dat. In certain embodiments, the configuration data may include multiple configuration files 142 in the binary format as the first configuration data of the BMC 120.

In certain embodiments, the configuration file 142 may include a version number of the firmware 130, which indicates the version information of the firmware 130 for updating the configuration file 142. For example, the first byte of the configuration file 142 may be used to store the version number. In certain embodiments, the version number stored in the configuration file 142 may be used to determine whether data migration is required. For example, in the booting operation, the management module 132 may compare the version number stored in the configuration file 142 to the version number of the executing firmware 130 to determine whether the version information of the configuration file 142 (i.e., the first configuration data) matches the version information of the firmware 130. If the version information matches, the management module 132 will determine that data migration is not required. If the version information does not match, the management module 132 will determine that data migration is required, and perform the data migration. For example, when the version number stored in the configuration file 142 is an unknown number to the executing firmware 130, the version information does not match.

The INI file 144 represents the second configuration data of the BMC 120 in the text-based format. Since the INI file 144 is in the text-based format, the firmware 130 of any version may be capable of recognizing the contents of the INI file 144. In other words, if a flashing operation occurs, the INI file 144 should be recognizable by both the pre-updated firmware and the post-updated firmware. Thus, the INI file 144 may be used for migration purposes. In certain embodiments, the INI file 144 is not needed when the management module 132 performs the management operation, or when the configuration update module 136 updates the configuration file 142. In other words, the INI file 144 is only necessary when migration is required. In certain embodiments, the configuration data may include multiple INI files 144 in the text-based format as the second configuration data of the BMC 120.

The migration library 146 includes migration data for data migration purposes. In particular, the migration library 146 includes data which indicates how the configuration file 142 in the binary format (i.e., the first configuration data) may be correctly converted to the INI file 144 in the text-based format (i.e., the second configuration data). Specifically, in the booting operation, if the management module 132 determines that data migration is necessary, the management module 132 may retrieve the use the migration data from the migration library 146, and then use the migration data to generate the INI file 144 by converting the configuration file 142 in the binary format (i.e., the first configuration data) to the INI file 144 in the text-based format (i.e., the second configuration data) based on the migration data. Since the firmware 130 of any version may recognize the contents of the INI file 144, the management module 132 may then convert the generated INI file 144 back to a configuration file in the binary format (i.e., third configuration data), and then use the converted configuration file (i.e., the third configuration data) to update the configuration file 142 (i.e., the first configuration data). Once the data migration is complete, the management module 132 may update the migration data of the migration library 146 with the migration library 139 of the firmware 130.

In certain embodiments, the non-volatile memory 126 has a file system mounted thereon. In certain embodiments, when the non-volatile memory 126 is a flash memory, the file system 210 may be a Journalling Flash File System version 2 (JFFS2). JFFS2 is a log-structured file system designed for use on flash devices in embedded systems. Rather than using a kind of translation layer on flash devices to emulate a normal hard drive, as is the case with older flash solutions, JFFS2 places the file system directly on the flash memory chips. JFFS2 supports NAND flash devices, and introduces hard links and compression, in which four compression algorithms are available: zlib, rubin, rtime and lzo.

Figure 2:
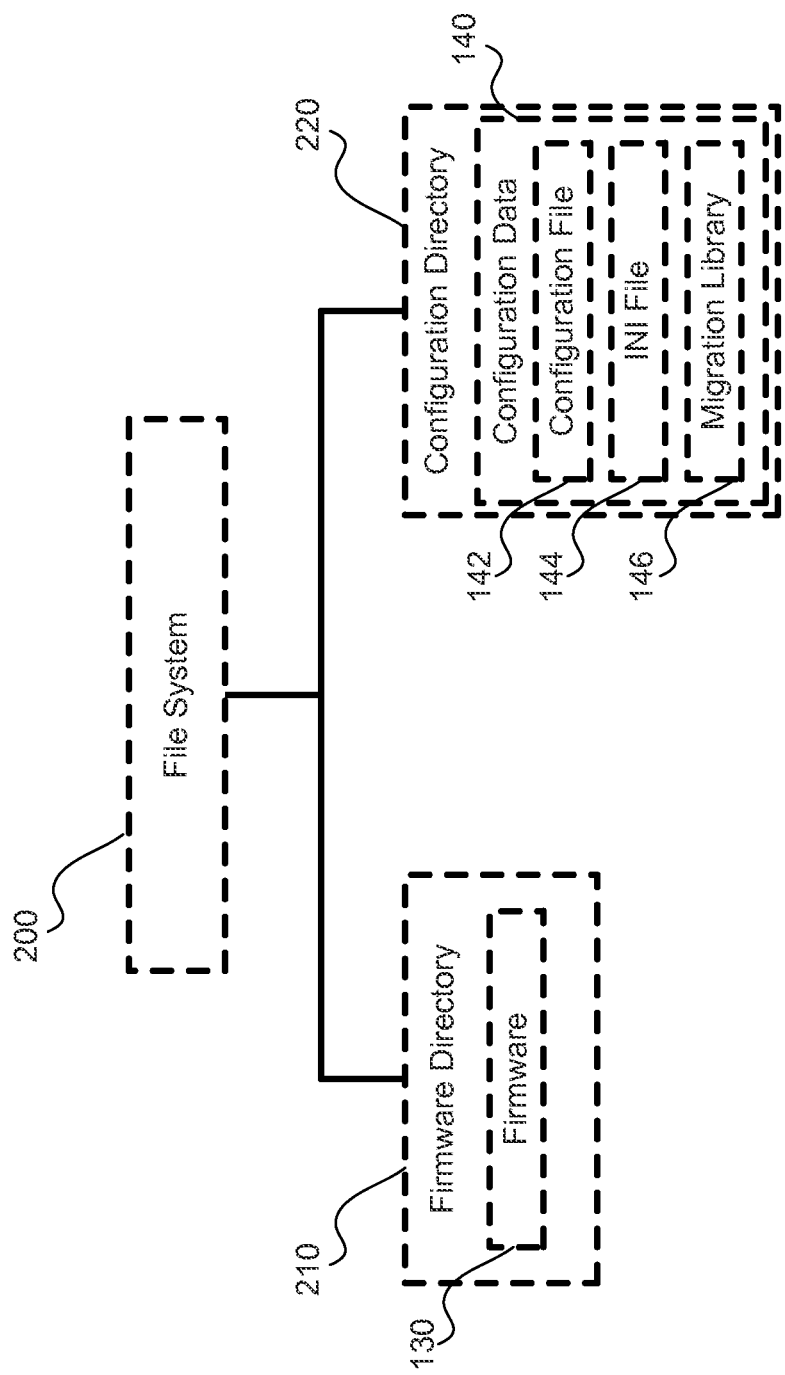
FIG. 2 schematically depicts a file system mounted on the non-volatile memory according to certain embodiments of the present disclosure.

FIG. 2 schematically depicts a file system mounted on the non-volatile memory according to certain embodiments of the present disclosure. As shown in FIG. 2, the file system 210 may define multiple directories, including a firmware directory 210 and a configuration directory 220. The firmware directory 210 is configured to store the files of the firmware 130, and the configuration directory 220 is configured to store the files of the configuration data 140, including the configuration file 142, the INI file 144, and the migration library 146. In certain embodiments, the files of the firmware 130 may be stored in multiple directories. In other words, the file system 200 may include one or more firmware directories 210 to store the files of the firmware 130.

In certain embodiments, the computer executable code of the files of the firmware 130 stored in the at least one firmware directory 210 may be read-only in the booting operation and in the management operation. In the flashing operation, however, the at least one firmware directory 210 must be made rewritable such that the computer executable code of the files of the firmware 130 may be updated by the flasher module 134. In comparison, the files stored in the configuration directory 220 should be rewritable in the booting operation and in the management operation, such that the configuration data may be updated by the configuration update module 136. In the flashing operation, however, the configuration directory 220 may be protected in a read-only mode such that the files stored therein would not be lost due to the firmware update.

Figure 3:
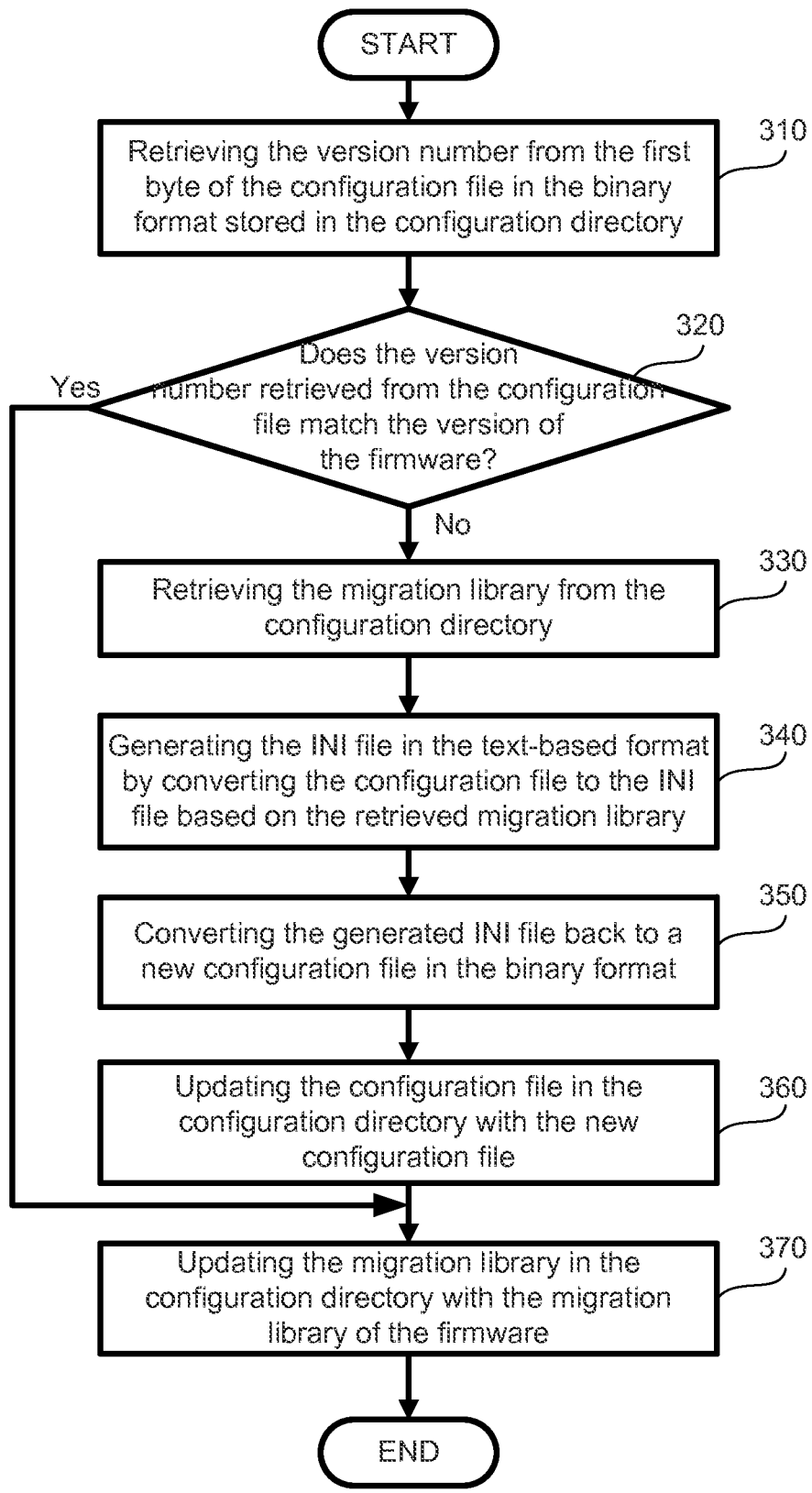
FIG. 3 depicts a flowchart showing a booting operation of the BMC according to certain embodiments of the present disclosure.

FIG. 3 depicts a flowchart showing a booting operation of the BMC according to certain embodiments of the present disclosure. As discussed above, the booting operation may be performed by the management module 132 of the BMC 120.

At procedure 310, when the booting operation is performed, the first task performed by the management module 132 is to retrieve the version number from the first byte of the configuration file 142 in the binary format (i.e., the first configuration data), which is stored in the configuration directory 220. Since the version number represents the version information of the configuration file 142 (i.e., the first configuration data) stored in the configuration directory, the management module 132 may compare the version number to the current version of the executing firmware 130, and determine if the version matches.

At procedure 320, the management module 132 may compare the version number to the current version of the executing firmware 130, and determine whether the version number retrieved from the configuration file 142 (i.e., the first configuration data) matches the version of the firmware 130. If the version information matches, the management module 132 will determine that data migration is not required, and move to procedure 370 without performing data migration. If the version information does not match, the firmware 130 may not access the configuration data in the configuration file 142 correctly. In this case, the management module 132 will determine that data migration is required, and move to procedure 330 to perform the data migration.

At procedure 330, the management module 132 retrieves the migration library 146 from the configuration directory 220. The migration library 146 includes the migration data, which indicates how the configuration file 142 in the binary format (i.e., the first configuration data) may be correctly converted to the INI file 144 in the text-based format (i.e., the second configuration data).

At procedure 340, the management module 132 generates the INI file 144 in the text-based format (i.e., the second configuration data) by converting the configuration file 142 to the INI file 144 based on the retrieved migration library 146. As discussed above, the INI file 144 is in the text-based format, and the executing firmware 130 may be capable of recognizing the contents of the INI file 144. Thus, At procedure 350, the management module 132 converts the generated INI file 144 back to a new configuration file in the binary format (i.e., the third configuration data). Since the new configuration file is converted by the management module 132 of the executing firmware 130, the firmware 130 may access the configuration data in the new configuration file correctly.

At procedure 360, the management module 132 updates the configuration file 142 (i.e., the first configuration data) stored in the configuration directory 220 with the new configuration file (i.e., the third configuration data). Once updated, the version number stored in the first byte of the configuration file 142 should match the version of the executing firmware 130. In this case, the firmware 130 may access the configuration data in the updated configuration file 142 correctly.

At procedure 370, the management module 132 updates the migration library 146 stored in the configuration directory 220 with the migration library 139 of the firmware 130. It should be particularly noted that, when the version information of the configuration file 142 (i.e., the first configuration data) stored in the configuration directory 220 matches the version information of the firmware 130, the migration data of the migration library 139 of the firmware 130 should be identical to the migration data of the migration library 146. However, to ensure the migration data of the migration library 146 matches the migration library 139 of the firmware 130, the procedure 370 may be performed regardless of whether data migration is performed. Thus, the migration data of the migration library 146 stored in the configuration directory 220 should match the migration library 139 of the firmware 130, such that the migration library 146 may be used in the next booting operation to convert the configuration file 142 in the binary format (i.e., the first configuration data) to the INI file 144 in the text-based format (i.e., the second configuration data) correctly if data migration is required.

Figure 4:
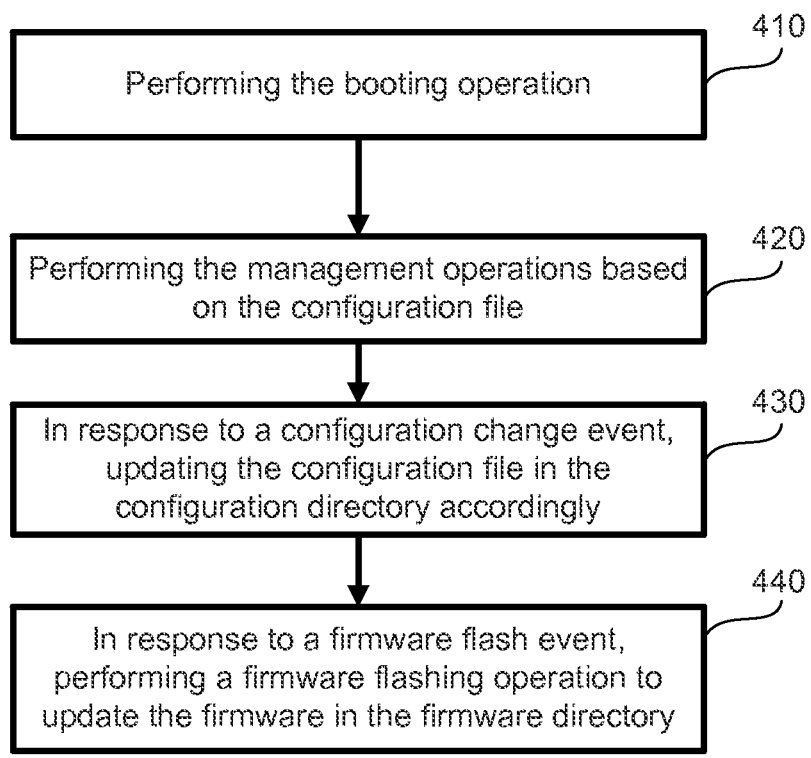
FIG. 4 depicts a flowchart showing a method of BMC operations according to certain embodiments of the present disclosure.

A further aspect of the present disclosure is directed to a method of reducing write cycles and increasing longevity of a non-volatile memory in a BMC. FIG. 4 depicts a flowchart showing a method of BMC operations according to certain embodiments of the present disclosure. In certain embodiments, the method as shown in FIG. 4 is performed on the BMC 120 as shown in FIG. 1.

At procedure 410, when the BMC 120 starts, the management module 132 performs the booting operation of the BMC. The procedures being performed in the booting operation have been described with reference to FIG. 3. At procedure 420, once the booting operation is complete, the management module 132 starts performing the management operations based on the configuration file 142 stored in the configuration directory 220.

At procedure 430, when a configuration change event occurs, in response to the configuration change event, the configuration update module 136 updates the configuration file 142 stored in the configuration directory 220 accordingly. It should be noted that the INI file 144 is not updated. Thus, the write cycles to the non-volatile memory 126 of the BMC may be reduced, thus increasing longevity of the non-volatile memory 126.

At procedure 440, when a firmware flash event occurs, in response to the firmware flash event, the flasher module 134 performs the firmware flashing operation to update the firmware 130 in the firmware directory 210. Once the firmware flashing operation is complete, the BMC 120 will reboot. In this case, data migration may be necessary.

In a further aspect, the present disclosure is related to a non-transitory computer readable medium storing computer executable code. The code, when executed at one or more processor of a BMC 120, may perform the method as described above. In certain embodiments, the non-transitory computer readable medium may include, but not limited to, any physical or virtual storage media. In certain embodiments, the non-transitory computer readable medium may be implemented as the non-volatile memory 126 of the BMC 120 as shown in FIG. 1.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system, comprising:
    a baseboard management controller (BMC), comprising a processor and a non-volatile memory having a file system mounted thereon, wherein the file system defines:
        a configuration directory configured to store first configuration data in a binary format and first migration data, wherein the first migration data indicates a conversion of the first configuration data from the binary format to a text-based format; and
        at least one firmware directory configured to store computer executable code, wherein the computer executable code comprises second migration data;
    wherein the computer executable code, when executed at the processor, is configured to:
        perform a booting operation of the BMC;
        perform at least one management operation based on the first configuration data; and
        in response to a configuration change event, update the first configuration data in the configuration directory based on the configuration change event,
    wherein the booting operation comprises:
        determining whether version information of the first configuration data stored in the configuration directory matches version information of the computer executable code;
        in response to determining that the version information of the first configuration data does not match the version information of the computer executable code,
            retrieving the first migration data from the configuration directory;
            generating second configuration data in the text-based format by converting the first configuration data to the second configuration data based on the retrieved first migration data;
            converting the generated second configuration data to third configuration data in the binary format, wherein the third configuration data comprises the version information of the computer executable code; and
            updating the first configuration data in the configuration directory with the third configuration data; and
            updating the first migration data in the configuration directory with the second migration data.

2. The system as claimed in claim 1, wherein the non-volatile memory is a flash memory, and wherein the file system is a Journalling Flash File System version 2 (JFFS2).

3. The system as claimed in claim 1, wherein the first configuration data comprises at least one configuration file.

4. The system as claimed in claim 3, wherein the version information of the first configuration data is a version number of the computer executable code.

5. The system as claimed in claim 4, wherein the version number is stored in the first byte of the at least one configuration file.

6. The system as claimed in claim 1, wherein the computer executable code stored in the at least one firmware directory is read-only in the booting operation and in the at least one management operation.

7. The system as claimed in claim 6, wherein the computer executable code, when executed at the processor, is further configured to:
    in response to a firmware flash event, perform a flashing operation to update the computer executable code in the at least one firmware directory, wherein the at least one firmware directory is rewritable in the flashing operation.

8. The system as claimed in claim 7, wherein the computer executable code comprises:
    a management module configured to perform the booting operation of the BMC, and to perform the at least one management operation based on the first configuration data;
    a flasher module configured to perform the flashing operation in response to the firmware flash event; and
    a configuration update module configured to update the first configuration data in the configuration directory in response to the configuration change event.

9. The system as claimed in claim 7, wherein the second configuration data in the text-based format comprises at least one initialization (INI) file recognizable by both the pre-updated computer executable code and the post-updated computer executable code.

10. The system as claimed in claim 1, wherein when the version information of the first configuration data matches the version information of the computer executable code, the second migration data is identical to the first migration data.

11. A method of reducing write cycles and increasing longevity of a non-volatile memory in a baseboard management controller (BMC), the method comprising:
    performing, at a processor of the BMC, a booting operation of the BMC, wherein the non-volatile memory has a file system mounted thereon, and wherein the file system defines:
        a configuration directory configured to store first configuration data in a binary format and first migration data, wherein the first migration data indicates a conversion of the first configuration data from the binary format to a text-based format; and
        at least one firmware directory configured to store computer executable code, wherein the computer executable code comprises second migration data;
    performing, at the processor of the BMC, at least one management operation based on the first configuration data; and
    in response to a configuration change event, updating, by the processor of the BMC, the first configuration data in the configuration directory based on the configuration change event,
    wherein the booting operation comprises:

determining whether version information of the first configuration data stored in the configuration directory matches version information of the computer executable code;

in response to determining that the version information of the first configuration data does not match the version information of the computer executable code, retrieving the first migration data from the configuration directory;

generating second configuration data in the text-based format by converting the first configuration data to the second configuration data based on the retrieved first migration data;

converting the generated second configuration data to third configuration data in the binary format, wherein the third configuration data comprises the version information of the computer executable code; and updating the first configuration data in the configuration directory with the third configuration data; and updating the first migration data in the configuration directory with the second migration data.

12. The method as claimed in claim 11, wherein the non-volatile memory is a flash memory, and wherein the file system is a Journalling Flash File System version 2 (JFFS2).

13. The method as claimed in claim 11, wherein the first configuration data comprises at least one configuration file.

14. The method as claimed in claim 13, wherein the version information of the first configuration data is a version number of the computer executable code, and the version number is stored in the first byte of the at least one configuration file.

15. The method as claimed in claim 11, further comprising:
in response to a firmware flash event, performing, at the processor of the BMC, a flashing operation to update the computer executable code in the at least one firmware directory, wherein the computer executable code stored in the at least one firmware directory is read-only in the booting operation and in the at least one management operation, and wherein the at least one firmware directory is rewritable in the flashing operation.

16. The method as claimed in claim 15, wherein the second configuration data in the text-based format comprises at least one initialization (INI) file recognizable by both the pre-updated computer executable code and the post-updated computer executable code.

17. The method as claimed in claim 11, wherein when the version information of the first configuration data matches the version information of the computer executable code, the second migration data is identical to the first migration data.

18. A non-transitory computer readable medium storing computer executable code, wherein the computer executable code, when executed at a processor of a baseboard management controller (BMC), is configured to perform a booting operation of the BMC, wherein the BMC comprises the processor and the non-transitory computer readable medium having a file system mounted thereon, and wherein the file system defines:

a configuration directory configured to store first configuration data in a binary format and first migration data, wherein the first migration data indicates a conversion of the first configuration data from the binary format to a text-based format; and at least one firmware directory configured to store the computer executable code, wherein the computer executable code comprises second migration data;

perform at least one management operation based on the first configuration data; and in response to a configuration change event, update the first configuration data in the configuration directory based on the configuration change event, wherein the booting operation comprises:

determining whether version information of the first configuration data stored in the configuration directory matches version information of the computer executable code;

in response to determining that the version information of the first configuration data does not match the version information of the computer executable code, retrieving the first migration data from the configuration directory;

generating second configuration data in the text-based format by converting the first configuration data to the second configuration data based on the retrieved first migration data;

converting the generated second configuration data to third configuration data in the binary format, wherein the third configuration data comprises the version information of the computer executable code; and updating the first configuration data in the configuration directory with the third configuration data; and updating the first migration data in the configuration directory with the second migration data.

19. The non-transitory computer readable medium as claimed in claim 18, being a flash memory, wherein the file system is a Journalling Flash File System version 2 (JFFS2).

20. The non-transitory computer readable medium as claimed in claim 18, wherein the first configuration data comprises at least one configuration file.

21. The non-transitory computer readable medium as claimed in claim 20, wherein the version information of the first configuration data is a version number of the computer executable code, and the version number is stored in the first byte of the at least one configuration file.

22. The non-transitory computer readable medium as claimed in claim 18, wherein the computer executable code, when executed at the processor, is further configured to:
in response to a firmware flash event, perform a flashing operation to update the computer executable code in the at least one firmware directory, wherein the computer executable code stored in the at least one firmware directory is read-only in the booting operation and in the at least one management operation, and wherein the at least one firmware directory is rewritable in the flashing operation.

23. The non-transitory computer readable medium as claimed in claim 22, wherein the computer executable code comprises:

a management module configured to perform the booting operation of the BMC, and to perform the at least one management operation based on the first configuration data;

a flasher module configured to perform the flashing operation in response to the firmware flash event; and a configuration update module configured to update the first configuration data in the configuration directory in response to the configuration change event.

24. The non-transitory computer readable medium as claimed in claim 22, wherein the second configuration data in the text-based format comprises at least one initialization (INI) file recognizable by both the pre-updated computer executable code and the post-updated computer executable code.

25. The non-transitory computer readable medium as claimed in claim 18, wherein when the version information of the first configuration data matches the version information of the computer executable code, the second migration data is identical to the first migration data.

\* \* \* \* \*